(12) United States Patent
Rustagi et al.

(10) Patent No.: US 7,681,007 B2
(45) Date of Patent: Mar. 16, 2010

(54) AUTOMATIC EXPANSION OF HARD DISK DRIVE CAPACITY IN A STORAGE DEVICE

(75) Inventors: Viresh Rustagi, Sunnyvale, CA (US); Christopher S. Wilson, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 238 days.

(21) Appl. No.: 11/106,840

(22) Filed: Apr. 15, 2005

(65) Prior Publication Data

US 2005/0235128 A1    Oct. 20, 2005

Related U.S. Application Data

(60) Provisional application No. 60/562,831, filed on Apr. 15, 2004.

(51) Int. Cl.
    *G06F 12/00* (2006.01)
(52) U.S. Cl. .................. 711/170; 711/112; 715/765
(58) Field of Classification Search ............. 711/170, 711/112; 715/765
    See application file for complete search history.

(56) References Cited

U.S. PATENT DOCUMENTS

| | | |
|---|---|---|
| 244,426 A | 7/1881 | Bell |
| 5,367,682 A | 11/1994 | Chang |
| 5,539,879 A | 7/1996 | Pearce et al. |
| 5,568,629 A * | 10/1996 | Gentry et al. ............... 711/114 |
| 5,615,352 A | 3/1997 | Jacobson et al. |
| 5,625,811 A | 4/1997 | Bhide et al. |
| 5,638,446 A | 6/1997 | Rubin |
| 5,640,595 A | 6/1997 | Baugher et al. |
| 5,680,540 A | 10/1997 | Pearce |
| 5,742,762 A | 4/1998 | Scholl et al. |

(Continued)

FOREIGN PATENT DOCUMENTS

EP    0 986 014 A2    3/2000

(Continued)

OTHER PUBLICATIONS

Windows 2000 Disk Management, Joe Froehlich, Jul. 2000, http://msdn.microsoft.com/archive/default.asp?url=/archive/en-us/dnarntpro00/html/management.asp, MSDN home: http://msdn2.microsoft.com/en-us/default.aspx.*

(Continued)

*Primary Examiner*—Matt Kim
*Assistant Examiner*—John P Fishburn
(74) *Attorney, Agent, or Firm*—McAndrews, Held & Malloy, Ltd.

(57) ABSTRACT

At least a method and system of automatically expanding storage capacity in a data storage device are presented. In one method, the data storage device receives additional hard disk drives. Next, the data storage device receives an expansion option from a user by way of a user interface. The data storage device allocates one or more portions of one or more hard disk drives within the storage device, for use by one or more data pools, based on the expansion option. In one system for automatically expanding storage capacity in a data storage device, the system comprises a memory, one or more processors, and one or more software. One or more data pools are generated using one or more hard disk drives added to the data storage device.

36 Claims, 9 Drawing Sheets

U.S. PATENT DOCUMENTS

| | | | |
|---|---|---|---|
| 5,742,818 A * | 4/1998 | Shoroff et al. | 707/200 |
| 5,790,548 A | 8/1998 | Sistanizadeh et al. | |
| 5,790,794 A | 8/1998 | DuLac et al. | |
| 5,802,554 A | 9/1998 | Caceres et al. | |
| 5,809,224 A * | 9/1998 | Schultz et al. | 714/7 |
| 5,854,942 A | 12/1998 | Penokie | |
| 5,898,835 A | 4/1999 | Truong | |
| 5,956,400 A | 9/1999 | Chaum et al. | |
| 5,974,566 A | 10/1999 | Ault et al. | |
| 6,003,078 A | 12/1999 | Kodimer et al. | |
| 6,009,466 A | 12/1999 | Axberg et al. | |
| 6,058,489 A * | 5/2000 | Schultz et al. | 714/7 |
| 6,125,186 A | 9/2000 | Saito et al. | |
| 6,138,150 A | 10/2000 | Nichols et al. | |
| 6,173,376 B1 | 1/2001 | Fowler et al. | |
| 6,253,296 B1 * | 6/2001 | Grimsrud et al. | 711/165 |
| 6,317,028 B1 | 11/2001 | Valiulis | |
| 6,347,359 B1 * | 2/2002 | Smith et al. | 711/114 |
| 6,378,071 B1 | 4/2002 | Sasaki et al. | |
| 6,405,284 B1 | 6/2002 | Bridge | |
| 6,438,639 B1 | 8/2002 | Bakke et al. | |
| 6,449,647 B1 | 9/2002 | Colby et al. | |
| 6,463,537 B1 | 10/2002 | Tello | |
| 6,473,788 B1 | 10/2002 | Kim et al. | |
| 6,487,170 B1 | 11/2002 | Chen et al. | |
| 6,502,131 B1 | 12/2002 | Vaid et al. | |
| 6,505,281 B1 | 1/2003 | Sherry | |
| 6,535,518 B1 | 3/2003 | Hu et al. | |
| 6,538,669 B1 | 3/2003 | Lagueux, Jr. et al. | |
| 6,578,034 B1 | 6/2003 | Rafanello | |
| 6,598,174 B1 | 7/2003 | Parks et al. | |
| 6,615,365 B1 | 9/2003 | Jenevein et al. | |
| 6,640,291 B2 | 10/2003 | Fujibayashi et al. | |
| 6,661,803 B1 | 12/2003 | Choi et al. | |
| 6,675,176 B1 | 1/2004 | Shinkai et al. | |
| 6,675,242 B2 | 1/2004 | Benson et al. | |
| 6,721,880 B1 | 4/2004 | Pike | |
| 6,742,116 B1 | 5/2004 | Matsui et al. | |
| 6,757,291 B1 | 6/2004 | Hu | |
| 6,890,204 B2 | 5/2005 | Yamawaki | |
| 6,915,307 B1 | 7/2005 | Mattis et al. | |
| 6,963,951 B2 | 11/2005 | Ng et al. | |
| 6,976,134 B1 | 12/2005 | Lolayekar et al. | |
| 7,010,701 B1 | 3/2006 | Bossemeyer, Jr. et al. | |
| 7,020,084 B1 | 3/2006 | Tanaka et al. | |
| 7,055,014 B1 | 5/2006 | Pawlowski et al. | |
| 7,093,005 B2 | 8/2006 | Patterson | |
| 7,127,585 B2 | 10/2006 | Shimada et al. | |
| 7,133,907 B2 | 11/2006 | Carlson et al. | |
| 7,171,442 B1 | 1/2007 | Huang | |
| 7,818,577 | 2/2007 | Shimada et al. | |
| 7,191,286 B2 | 3/2007 | Forrer, Jr. et al. | |
| 7,299,314 B2 | 11/2007 | Lin et al. | |
| 7,330,897 B2 | 2/2008 | Baldwin et al. | |
| 7,343,493 B2 | 3/2008 | Challener et al. | |
| 7,373,517 B1 | 5/2008 | Riggins | |
| 2001/0029583 A1 | 10/2001 | Palatov et al. | |
| 2001/0056434 A1 | 12/2001 | Kaplan et al. | |
| 2002/0003884 A1 | 1/2002 | Sprunk | |
| 2002/0007416 A1 | 1/2002 | Putzolu | |
| 2002/0010522 A1 * | 1/2002 | Martin | 700/97 |
| 2002/0029274 A1 | 3/2002 | Allen | |
| 2002/0059539 A1 | 5/2002 | Anderson | |
| 2002/0087653 A1 * | 7/2002 | Duroj | 709/213 |
| 2002/0120697 A1 | 8/2002 | Generous et al. | |
| 2002/0152416 A1 * | 10/2002 | Fukuda | 714/7 |
| 2002/0154645 A1 | 10/2002 | Hu et al. | |
| 2002/0157113 A1 | 10/2002 | Allegrezza | |
| 2002/0174227 A1 | 11/2002 | Hartsell et al. | |
| 2002/0174296 A1 * | 11/2002 | Ulrich et al. | 711/114 |
| 2002/0177471 A1 | 11/2002 | Kaaresoja et al. | |
| 2002/0188738 A1 | 12/2002 | Gray | |
| 2003/0023811 A1 | 1/2003 | Kim et al. | |
| 2003/0033494 A1 | 2/2003 | Fujibayashi et al. | |
| 2003/0051135 A1 | 3/2003 | Gill et al. | |
| 2003/0079016 A1 | 4/2003 | Tsao | |
| 2003/0086023 A1 | 5/2003 | Chung et al. | |
| 2003/0117500 A1 | 6/2003 | Lin | |
| 2003/0120784 A1 | 6/2003 | Johnson et al. | |
| 2003/0146929 A1 | 8/2003 | Baldwin et al. | |
| 2003/0208763 A1 | 11/2003 | McElhatten et al. | |
| 2003/0233572 A1 | 12/2003 | Van Ackere et al. | |
| 2004/0030800 A1 | 2/2004 | Gray et al. | |
| 2004/0044749 A1 | 3/2004 | Harkin | |
| 2004/0047379 A1 | 3/2004 | Kitamura | |
| 2004/0054717 A1 | 3/2004 | Aubry et al. | |
| 2004/0078460 A1 | 4/2004 | Valavi et al. | |
| 2004/0117836 A1 | 6/2004 | Karaoguz et al. | |
| 2004/0153642 A1 | 8/2004 | Plotkin et al. | |
| 2004/0193824 A1 | 9/2004 | Johnson | |
| 2004/0205766 A1 | 10/2004 | Lee et al. | |
| 2004/0210654 A1 | 10/2004 | Hrastar | |
| 2004/0258390 A1 | 12/2004 | Olson | |
| 2004/0261093 A1 | 12/2004 | Rebaud et al. | |
| 2005/0015601 A1 * | 1/2005 | Tabi | 713/182 |
| 2005/0015805 A1 | 1/2005 | Iwamura | |
| 2005/0021781 A1 | 1/2005 | Sunder et al. | |
| 2005/0050160 A1 | 3/2005 | Upendran et al. | |
| 2005/0081004 A1 | 4/2005 | Zhang | |
| 2005/0091453 A1 | 4/2005 | Shimada et al. | |
| 2005/0091454 A1 | 4/2005 | Shimada et al. | |
| 2005/0171661 A1 | 8/2005 | Abdel-Malek et al. | |
| 2005/0188211 A1 | 8/2005 | Scott et al. | |
| 2005/0198194 A1 | 9/2005 | Burkey | |
| 2005/0223014 A1 | 10/2005 | Sharma et al. | |
| 2005/0250473 A1 | 11/2005 | Brown et al. | |
| 2006/0007491 A1 | 1/2006 | Kanda et al. | |
| 2006/0095962 A1 | 5/2006 | Lioy et al. | |
| 2006/0126846 A1 | 6/2006 | Araki et al. | |
| 2007/0106872 A1 | 5/2007 | Shimada et al. | |
| 2008/0072319 A1 | 3/2008 | Sakai | |

FOREIGN PATENT DOCUMENTS

| | | |
|---|---|---|
| EP | 1 398 964 A2 | 3/2004 |
| WO | 02/31701 A2 | 4/2002 |
| WO | 02/32140 A2 | 4/2002 |
| WO | 03/025726 A1 | 3/2003 |
| WO | 03/047235 A2 | 6/2003 |
| WO | 2004/023786 A2 | 3/2004 |

OTHER PUBLICATIONS

IEEE 100: The Authoritative Dictionary of IEEE Standards Terms, 7th edition, Dec. 2000, IEEE Press, pp. 1038, 1039.*

Building Storage Networks, 2nd edition, Marc Farley, 2001, Osborne/McGraw-Hill.*

IBM Object-Oriented Interface Design, Que Corporation, Carmel, IN, first edition, 1992.*

Tanenbaum, A., "Section 1.4: Hardware, Software, and Multilevel Machines", Structured Computer Organization, 1990, 3 pages, Third Edition, Prentice Hall, Englewood Cliffs, New Jersey.

Berkshire Encyclopedia of Human-Computer Interaction, Definition of "Identity Authentication", 2004, 6 pages, Berkshire Publishing Group, http://www.xreferplus.com, printed Nov. 27, 2007.

Dictionary of Multimedia and Internet Applications: A Guide for Developers and Users, Definition of "IP Address", 1999, 2 pages, John Wiley & Sons, Ltd., http://www.credoreference.com/entry3480944, printed Nov. 30, 2007.

Oxford English Dictionary, Definition of "appliance", 1989, 2 pages, Second Edition, http://dictionary.oed.com/cgi/entry/50010774, printed Nov. 29, 2007.

Oxford English Dictionary, Definition of "associate", 1989, 5 pages, Second Edition, http://dictionary.oed.com/cgi/entry/50013492, printed Nov. 27, 2007.

Oxford English Dictionary, Definition of "enable", 1989, 5 pages, Second Edition, http://dictionary.oed.com/cgi/entry/50074423, printed Nov. 27, 2007.

IBM Corporation, "Object-Oriented Interface Design; IBM Common User Access Guidelines", Dec. 1992, 4 pages, Que Corporation, Carmel, Indiana.

Special Edition Using Microsoft Windows 2000 Professional, Que, Feb. 24, 2000, ISBN-10: 0-7897-2125-2, ISBN-13: 978-0-7897-2125-9, pp. 1-8.

"Partition Table Definition", The Linux Information Project, retrieved from "http://www.linfo.org/partition_table.html" on Jul. 7, 2008.

Broadcom, BCM4780P Product Brief, 2003, Broadcom.

HP, "Media Vault Disk Layout", Jan. 6, 2005, 9 pages, http://www.k01ee.com/hpmediavault/diskformat/index.html.

PC Magazine, Definition of "S/PDIF", 1981, 3 pages, http://www.pcmag.com/encyclopedia_term.

Ku, Hosoon, et al., "Web-based Configuration Management Architecture for Router Networks", Apr. 2000, pp. 173-186, Menlo Park, CA.

Karp, David A., "Taking Control of Web Integration", 1998, pp. 326-328.

Webopedia, "operating system", Jan. 4, 2002, 3 pages, WebMediaBrands, Inc.

Hargrave's Communication Dictionary, Definition of "flash memory", 2001, 2 pages, Institute of Electrical and Electronics Engineers, Inc.

The Penguin English Dictionary, Definition of "RFID", 1986, 2 pages, Merriam-Webster Inc. and Longman Group Ltd.

Eagleson, J. et al., "RFID/Automotive Applications", Feb. 1997, pp. 1-13, Wireless Symposium, Santa Clara, CA.

* cited by examiner

AUTOMATIC EXPANSION OF HARD DISK DRIVE CAPACITY IN A STORAGE DEVICE

CROSS-REFERENCE TO RELATED APPLICATIONS/INCORPORATION BY REFERENCE

This application makes reference to and claims priority from U.S. Provisional Patent Application Ser. No. 60/562,831, entitled "AUTOMATIC EXPANSION OF HARD DISK DRIVE CAPACITY IN A STORAGE DEVICE", filed on Apr. 15, 2004, the complete subject matter of which is incorporated herein by reference in its entirety.

This application is related to and/or makes reference to:
U.S. application Ser. No. 11/049,905, filed Feb. 3, 2005;
U.S. application Ser. No. 11/087,136, filed Mar. 22, 2005;
U.S. application Ser. No. 11/107,017, filed Apr. 15, 2005;
U.S. application Ser. No. 11/107,224, filed Apr. 15, 2005;
U.S. application Ser. No. 11/102,441, filed Apr. 8, 2005;
U.S. application Ser. No. 11/101,734, filed Apr. 8, 2005;
U.S. application Ser. No. 11/096,167, filed Mar. 30, 2005;
U.S. application Ser. No. 11/049,772, filed Feb. 3, 2005;
U.S. application Ser. No. 11/049,798, filed Feb. 3, 2005;
U.S. application Ser. No. 11/086,189, filed Mar. 22, 2005; and
U.S. application Ser. No. 11/049,768, filed Feb. 3, 2005.

The above stated applications are hereby incorporated herein by reference in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

As a user adds additional applications onto his data processing or computing device, he may need to increase the amount of data storage capacity in order to efficiently execute these applications. The user may incorporate additional data storage capacity in the form of one or more additional hard disk drives in order to increase data storage capacity. In many instances, the user may spend time performing a data storage capacity upgrade himself. Furthermore, the time involved, by the user, to add, replace, and reconfigure one or more additional hard disk drives may result in inconvenience and frustration to the user. In other instances, the user may resort to hiring one or more service technicians to perform the upgrade. However, the labor cost for performing the upgrade may be undesirable.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention incorporate a method and system of automatically reconfiguring or resizing the data storage capacity of a data storage device when one or more hard disk drives are added to the data storage device, substantially shown and described in connection with at least one of the following figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Figure 1:
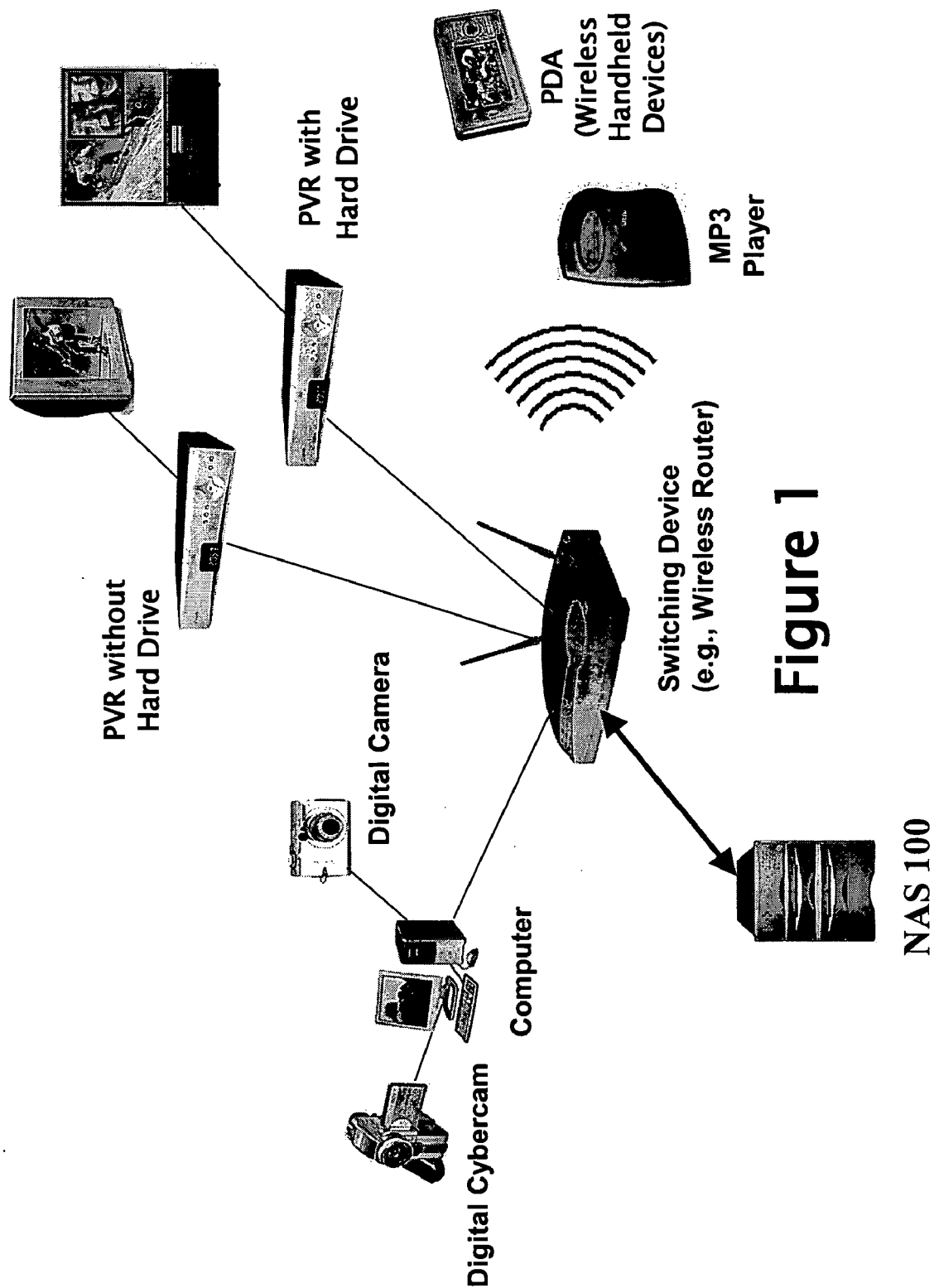
FIG. 1 illustrates a block diagram of a typical system incorporating the use of a NAS in accordance with various aspects of the present invention.

Aspects of the invention incorporate a method and system of automatically reconfiguring or resizing the data storage capacity of a data storage device when one or more data storage drives, such as hard disk drives, are added to the data storage device. Various aspects of the present invention facilitate expansion of existing capacity of a data storage device by way of easily configuring the additional storage space provided by the one or more hard disk drives. The storage capacity provided by the addition of the one or more hard disk drives may be used to create one or more data pools and may be represented using one or more data pool directories. The one or more data pools may be used to create one or more shares and the shares may be represented using one or more shared subdirectories. The shares may be allocated for use by one or more groups of authorized users. Various aspects of the present invention may be found as one or more hard disk drives that are collectively incorporated into a networked data storage device. The networked data storage device may be communicatively coupled to one or more data processing or computing devices by way of using one or more switching devices in the network. The one or more data processing devices may utilize the data storage device as a centralized data storage facility. The data storage device, hereinafter, may be referred to as a network attached storage device (NAS).

In a representative embodiment, the data storage device may comprise one or more data storage drives, such as hard disk drives, or any other type of media drive. The data storage device may comprise a combination of different types of data storage drives. A data storage drive may comprise any type of media capable of storing data. The media types may comprise magnetic, optical, flash memory, and the like.

Hereinafter, the term "hard disk drive" alternatively may refer to a data storage drive or any drive or component comprising a media used to store data. In a representative embodiment, one or more data storage drives or hard disk drives may be incorporated into a data storage device. The data storage device comprises the one or more data storage drives or hard disk drives. In a representative embodiment, the data storage device facilitates the incorporation of the one or more additional data storage drives or hard disk drives.

In a representative embodiment, a user-friendly graphical user interface (GUI) allows a user to effectuate a data storage expansion. The GUI facilitates pointing, clicking, and/or dragging one or more visual objects (or identifiers) that are displayed by the GUI. The pointing, clicking, and dragging, performed by a mouse, for example, may serve to increase or decrease one or more variables/parameters associated with the one or more visual objects displayed by the GUI. The one or more variables/parameters may comprise the amount of space allocated to a particular data pool, for example. For example, a data pool corresponds to a pooling of disk space using disk space provided by one or more hard disk drives. The pooling of data storage capacity results in the efficient utilization of hard drive space provided by the one or more hard disk drives. For example, one or more available portions of unallocated disk drive space may be concatenated to form a data pool. Hence, a pool may be considered a logical drive. The one or more variables/parameters may comprise hard disk drive space associated with one or more levels of RAID, unused hard disk drive space in a pool, JBOD space, and the like. In one embodiment, modification of the one or more visual objects displayed by the GUI adjusts or resizes one or more data pools of the one or more hard disk drives. When the data pools are resized, one or more portions of the one or more hard disk drives may be resized and subsequently grouped or concatenated, to form one or more data pools. Each of these data pools may be partitioned or organized into one or more shares in which an authorized user may only access the one or more shares. The one or more shares may comprise non-overlapping portions of data storage capacity in the one or more hard disk drives of the NAS. Authorization may occur when a user inputs one or more passwords using the GUI, for example. Aspects of the present invention allow the user to input quantities or values associated with the one or more variables/parameters into one or more fields of the GUI. Various aspects of the present invention provide one or more "pull-down" fields in the GUI, in which a user may select one of several different selections associated with the one or more variables. The GUI may allow a user to provide one or more selections by way of one or more selectable "radio buttons" so as to effectuate the creation of data pools, the deletion of data pools, and the renaming of existing data pools. Various aspects of the present invention allow a user to re-partition or resize one or more hard disk drives by way of using the GUI. The re-partitioning involves the adjustment of the one or more hard disk drive's used space, free space, or unallocated disk space, which may be performed when one or more additional drives are added to the NAS.

FIG. 1 illustrates a block diagram of a typical system incorporating the use of a NAS 100 in accordance with various aspects of the present invention. The NAS 100 provides data storage for one or more data processing or computing devices. As illustrated, an exemplary switching device provides connectivity of the NAS 100 to the one or more data processing devices. The switching device is capable of providing connectivity using wireless or wireline communications. For example, a wireless router may utilize any one of the following wireless or wireline data communications protocols: 10/100 Ethernet, gigabit Ethernet, 802.11x, Bluetooth, and the like. The one or more data processing devices may comprise a digital cybercam, digital camera, MP3 player, PDA, and one or more personal video recorders (PVRs), for example. As illustrated, a PVR may be equipped with or without a hard disk drive. In one embodiment, a PVR may be referred to as a set-top-box (STB) that incorporates personal video recorder capabilities. In one embodiment, a PVR may be referred to as a PVR-STB. The PVRs illustrated, are connected to a television or a monitor capable of playing multimedia content to a home user. Use of the NAS 100 provides a centralized storage device for multimedia content received by the one or more PVRs. As a consequence of storing content in a NAS 100, PVRs lacking a storage facility may use a NAS 100 to store and retrieve data. Further, any data that is stored into the NAS 100 by other data processing devices, including other PVRs, may be easily accessed and viewed by any of the other data processing devices. As a result, the NAS 100 facilitates sharing of data among the one or more data processing devices. Since it provides a remote storage mechanism, the NAS 100 may be considered a "virtual storage device" by the one or more data processing devices. The NAS 100 is configured such that its storage capacity may be easily expanded. With respect to various aspects of the present invention, the NAS 100 may accept additional hard disk drives. The storage capacity of the NAS is easily expanded by inserting a hard disk drive into a "drive sled" which is easily inserted into the chassis of the NAS 100. The "drive sled" may be considered a device that interfaces or mates with one or more types of hard disk drives, such that insertion into the NAS 100 is performed effortlessly. For example, an existing hard disk drive may be replaced with one having a higher capacity. A NAS 100 may comprise additional empty "drive sleds" capable of holding additional drives, suitable for future growth and expansion.

Figure 2:
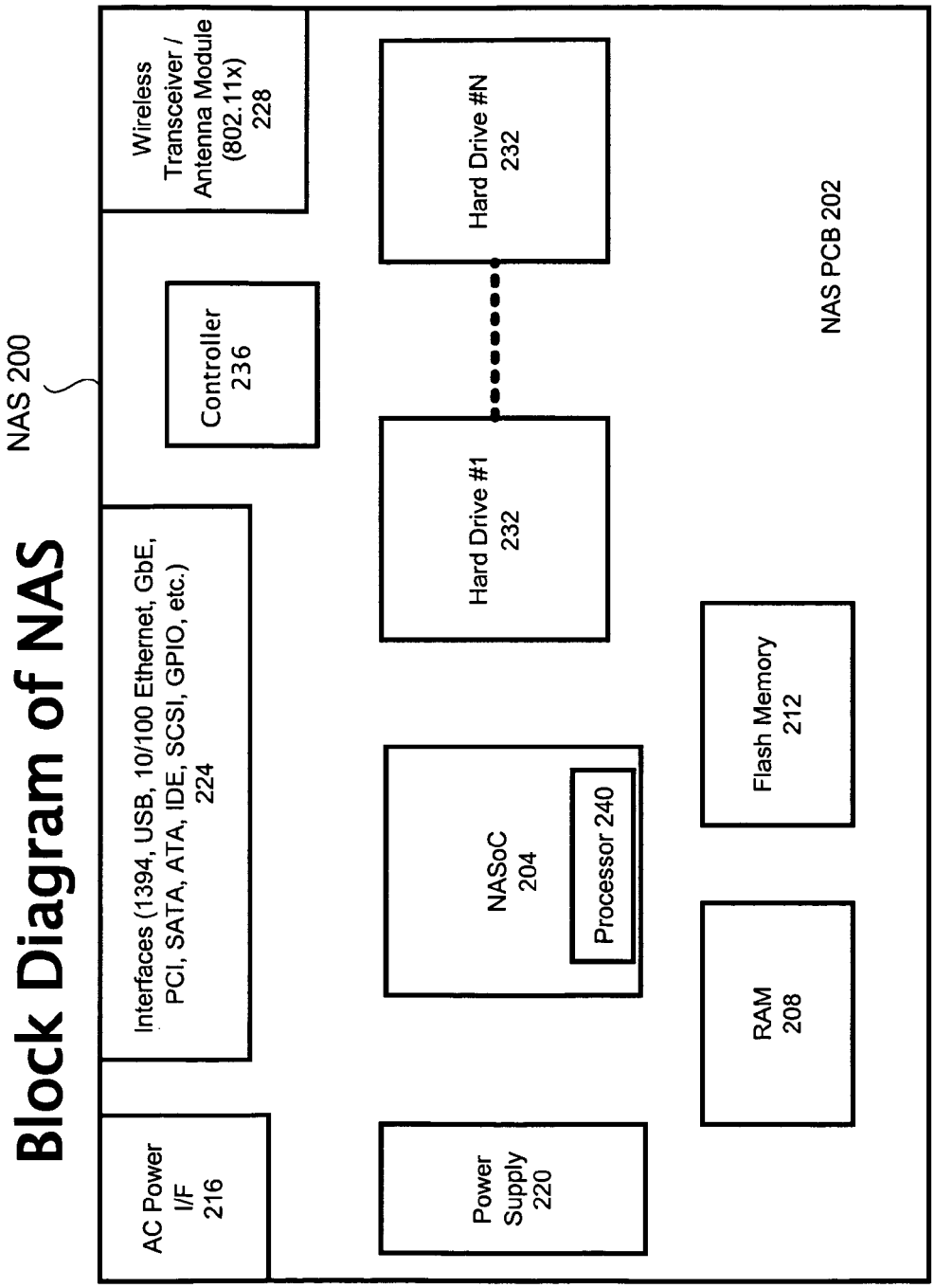
FIG. 2 is a component block diagram of a network attached storage device (NAS) in accordance with various aspects of the present invention.

FIG. 2 is a component block diagram of a network attached storage device (NAS) 200 in accordance with various aspects of the present invention. The NAS 200 comprises a printed circuit board (NAS PCB) 202 containing one or more components. The one or more components are electrically connected by way of the printed circuit board (PCB) 202. The one or more components comprises a NAS chip (NASoC) 204, a random access memory 208, a flash memory 212, an AC power interface 216, a power supply 220, a block of interfaces 224, a wireless transceiver/antenna module 228, one or more hard disk drives 232, and a controller 236. The interface block 224 may comprise one or more of the following interfaces: IEEE 1394, USB, 10/100 Ethernet, gigabit Ethernet, PCI, SATA, ATA, IDE, SCSI, GPIO, etc. The wireless transceiver/antenna module 228 may comprise an attachable module or mini-PCI card that may be optionally connected or attached to the NAS' printed circuit board 202. As illustrated, the NAS 200 may utilize up to N hard disk drives 232. The NAS 200 may be configured to comprise any number of hard drives, based on its intended use. The number of hard disk drives utilized, for example, may depend on the number of users accessing the NAS 200 or the types of applications used. The number of hard drives utilized, for example, may also be dependent on the extent of data mirroring or data striping (i.e., RAID) desired. Aspects of the present invention allow for storage capacity expansion since the NAS is designed to accommodate additional drives. Aspects of the invention allow the addition of drives of different sizes and/or speeds when implementing RAID 0 or RAID 1 functions, for example (i.e., each of the pair of drives performing RAID 1 (data mirroring) may not be identical in size or speed). One or more additional drives are incorporated by easily connecting one or more types of drives (having different form factors) into a hard drive carrier or "drive sled" that easily slides into the NAS chassis. In one embodiment, the controller 236 provides control for any one of several devices (such as hard disk drives) connected to the NASoC 204. The NASoC 204 may comprise an integrated circuit chip incorporating a processor or central processing unit (CPU) 240.

Figure 3:
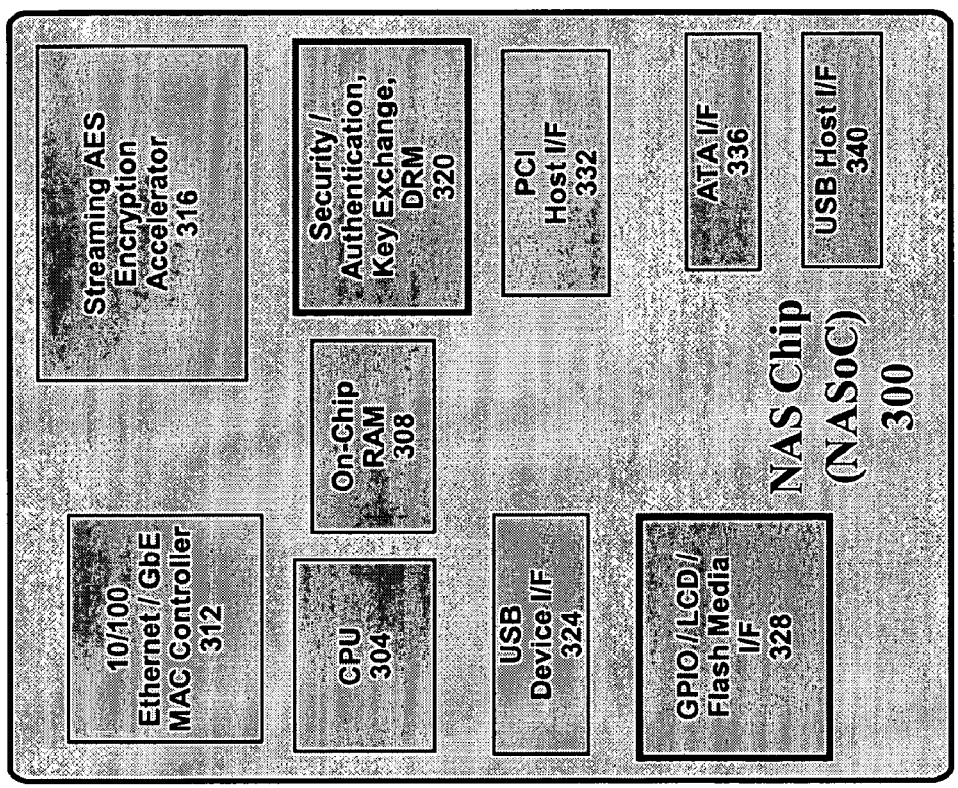
FIG. 3 is a block diagram of a NAS chip (NASoC) in accordance with various aspects of the present invention.

FIG. 3 is a block diagram of a NAS chip (NASoC) 300 in accordance with various aspects of the present invention. The NASoC 300 is an integrated circuit mounted on the previously described NAS PCB. The NASoC 300 provides one or more functions that allow the NAS to properly operate. The NASoC 300 comprises a central processing unit (CPU) 304, an on-chip random access memory 308, an Ethernet/MAC controller 312, an encryption accelerator 316, a security/authentication, key exchange, DRM chip 320, and a number of interfaces 328, 332, 336, 340. The interfaces 324, 328, 332, 336, 340 may comprise, for example, the following type of interfaces: USB device I/F 324, a PCI host I/F 332, a GPIO/LCD/flash media I/F 328, an ATA I/F 336, and a USB host I/F 340. The NAS chip 300 may communicate and/or connect to the one or more components described in reference to FIG. 2.

Referring to FIG. 2, the NAS 200 may incorporate varying numbers of hard disk drives depending on its storage and RAID (mirroring and/or striping) requirements. For example, the NAS 200 may utilize 4 hard disk drives for implementing RAID 0+1 (both data mirroring and data striping), suitable for use in a small office/business environment. On the other hand, the NAS 200 may utilize only 1 or 2 hard disk drives in a home (or household) environment since the storage capacity utilized is typically less than that utilized in an office or business environment. Similarly, memory components utilized in the NAS 200 may be varied depending on type of use. As the data storage requirements increase and as the frequency of data storage related requests increase, the performance of the NAS 200 may be improved to meet its operational needs, by way of increasing memory size of the NAS 200. For example, flash or DRAM memory capacities may be increased in order to improve the processing performance of the NAS 200.

In a representative embodiment, the processor 240 within the NASoC (204 or 300) executes software or firmware residing within the RAM 208 and/or flash memory 212 when the NAS 200 is booted up or powered up. Execution of the software may generate the graphical user interface (GUI) previously described. Execution of the software may cause the NAS 200 to acts as an http (hypertext transfer protocol) server to serve one or more pages to a user's workstation (e.g., client workstation), facilitating the display of the desired graphical user interface (GUI). As such, the http server serves files to the user's workstation. The software that is executed by the processor 240 may comprise a configuration file that is accessed and recognized by an operating system, such as a Microsoft Windows operating system, such that it may be viewed and run by the exemplary Windows Explorer application. The configuration file may be accessible before a user completes an initialization procedure on the NAS 200. The initialization process may involve creating one or more authentication passwords that are used in the future for accessing the configuration file. The Microsoft Windows operating system may comprise Windows XP, 2000, ME, 98, Pocket PC, or the like. When the configuration file is executed, by clicking on its filename as displayed by the Windows Explorer application, a user interface is displayed to a user's data processing device. The user interface may comprise one or more tabs that point to one or more pages that contain one or more fields, such that a user may input one or more parameters or values. Thereafter, a user may provide one or more inputs to initialize or configure the NAS 200. The inputs may comprise the following: a name for the NAS 200, an administration username, an administration password, one or more alternate security actuators, time, time zone, network time server internet protocol addresses, drive or data pool names, RAID type indicators, drive pool share names, share access passwords, and size of data pools. The data pool names, RAID type indicators, data pool share names, and share access passwords are exemplary parameters used in the management of the hard disk drives within the NAS 200. With respect to one or more aspects of the present invention, the previously mentioned parameters may be stored in the RAM 208 or flash memory 212 of the NAS 200, as previously referenced in FIG. 2. The flash memory may comprise a non-volatile random access memory (NVRAM).

Figure 4:
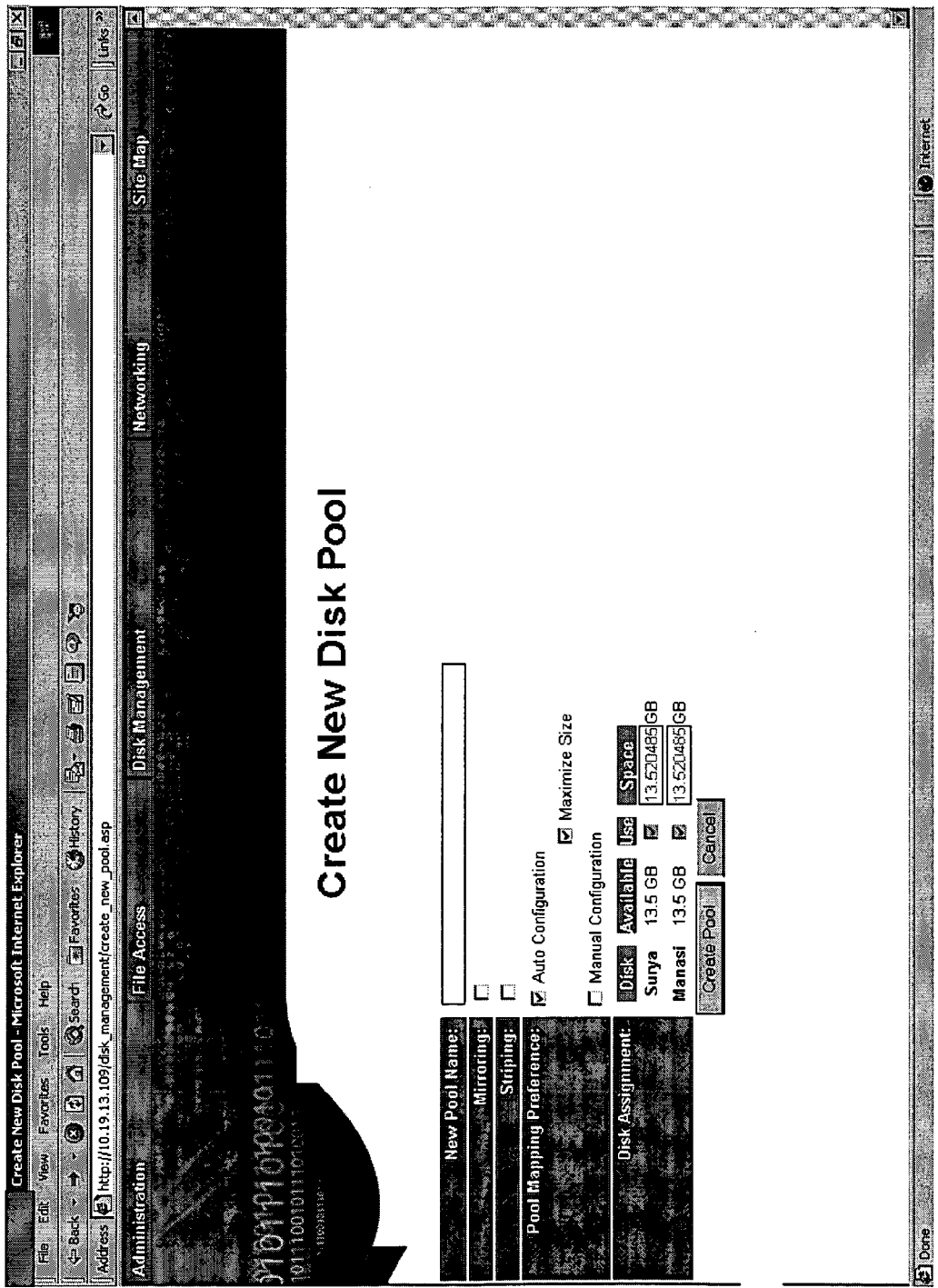
FIG. 4 displays a graphical user interface (GUI) generated by the NAS that allows a user to configure a new disk pool using one or more hard disk drives, in accordance with various aspects of the present invention.

FIG. 4 displays a graphical user interface (GUI) generated by the NAS that allows a user to configure a new disk pool using one or more hard disk drives, in accordance with various aspects of the present invention. For example, FIG. 4 displays two disk drives along with their respective capacities. As shown, the two disk drives, named Surya and Manasi, each have available capacities of 13.5 Gbytes. The exemplary user interface provides fields in which a user may adjust the allocation size of each of the two disk drives used to form the data pool. The GUI also allows a user to determine whether mirroring or striping of the data pool is to occur.

Figure 5:
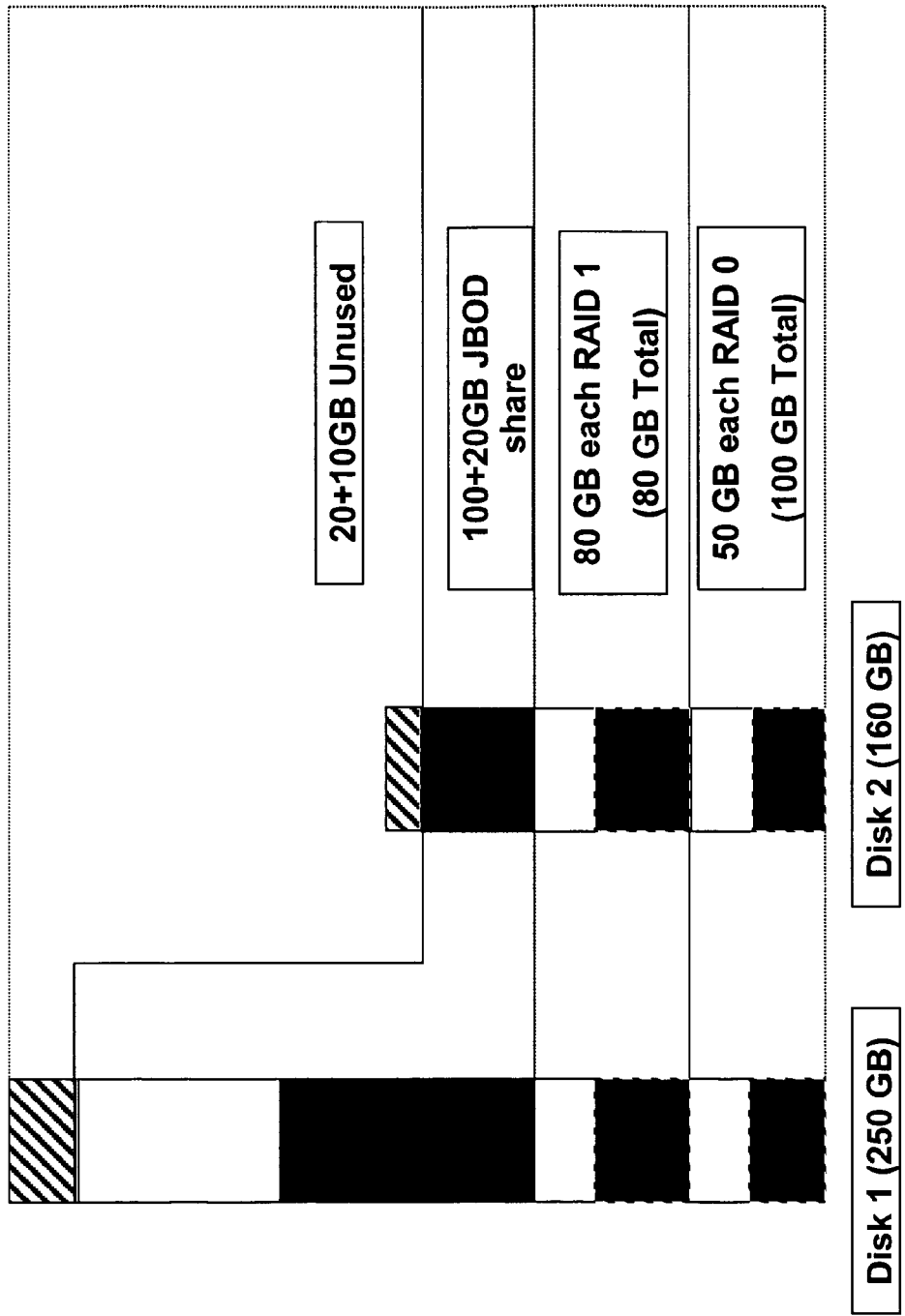
FIG. 5 illustrates a screen shot of a browser, such as Windows Explorer or Netscape, that provides a graphical user interface in which a user may point, click, and drag one or more displayed objects or visual indicators, in accordance with various aspects of the present invention.

FIG. 5 illustrates a screen shot of a browser, such as Windows Explorer or Netscape, that provides a graphical user interface in which a user may point, click, and drag one or more displayed objects or visual indicators, in accordance with various aspects of the present invention. The user may configure the storage capacity of each hard disk drive that is allocated to RAID 0 or RAID 1, JBOD, or unused.

Figure 6:
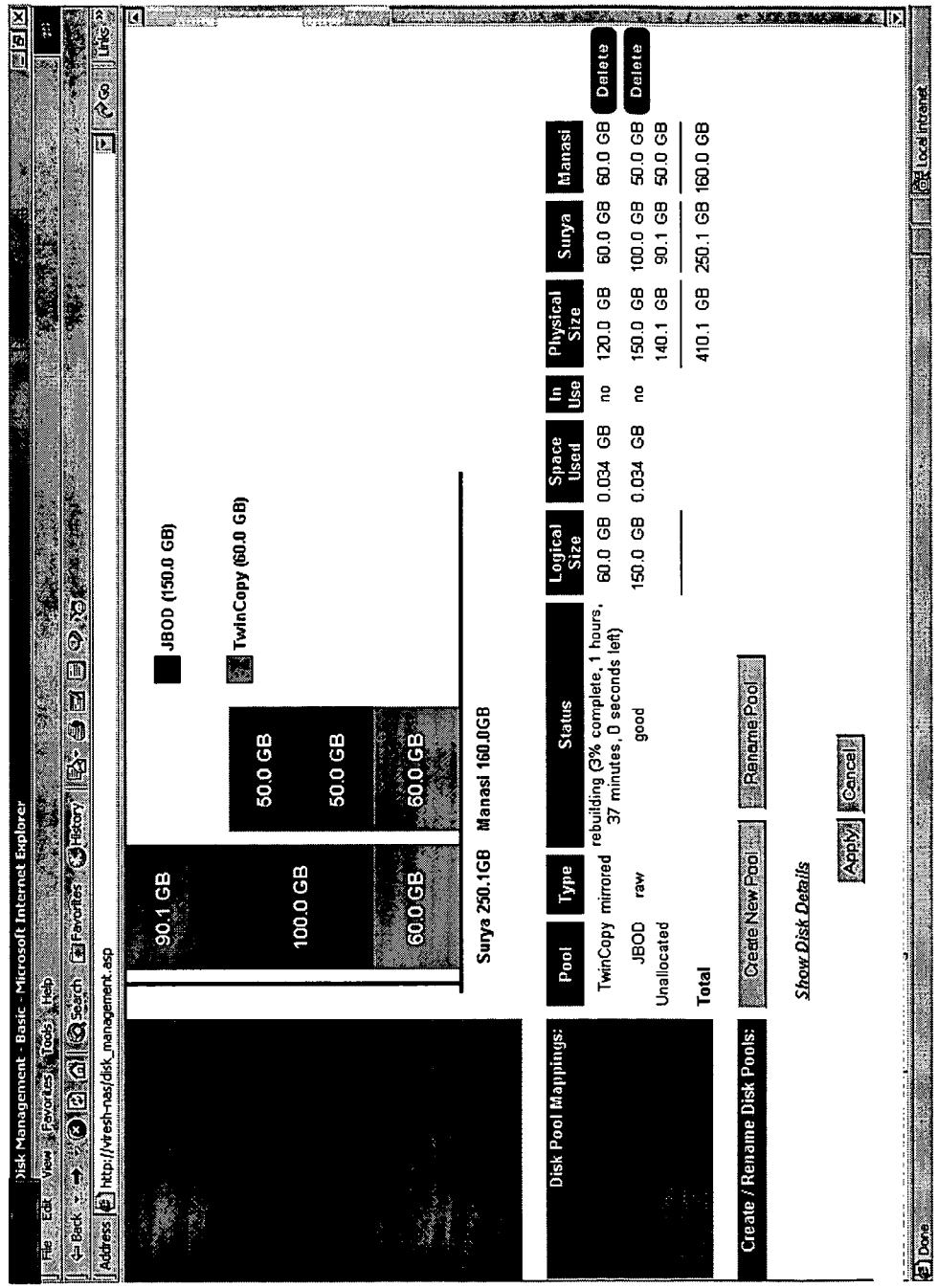
FIG. 6 illustrates a screen shot of a browser that provides an exemplary disk management interface that allows a user to create, delete, or rename one or more hard disk drive pools, in accordance with various aspects of the present invention.

FIG. 6 illustrates a screen shot of a browser that provides an exemplary disk management interface that allows a user to create, delete, or rename one or more hard disk drive pools, in accordance with various aspects of the present invention. The disk management interface provides the allocation status of each of the hard disk drives in a data storage device, such as a NAS. The sizes and locations of each data pool are graphically illustrated and quantified.

Figure 7:
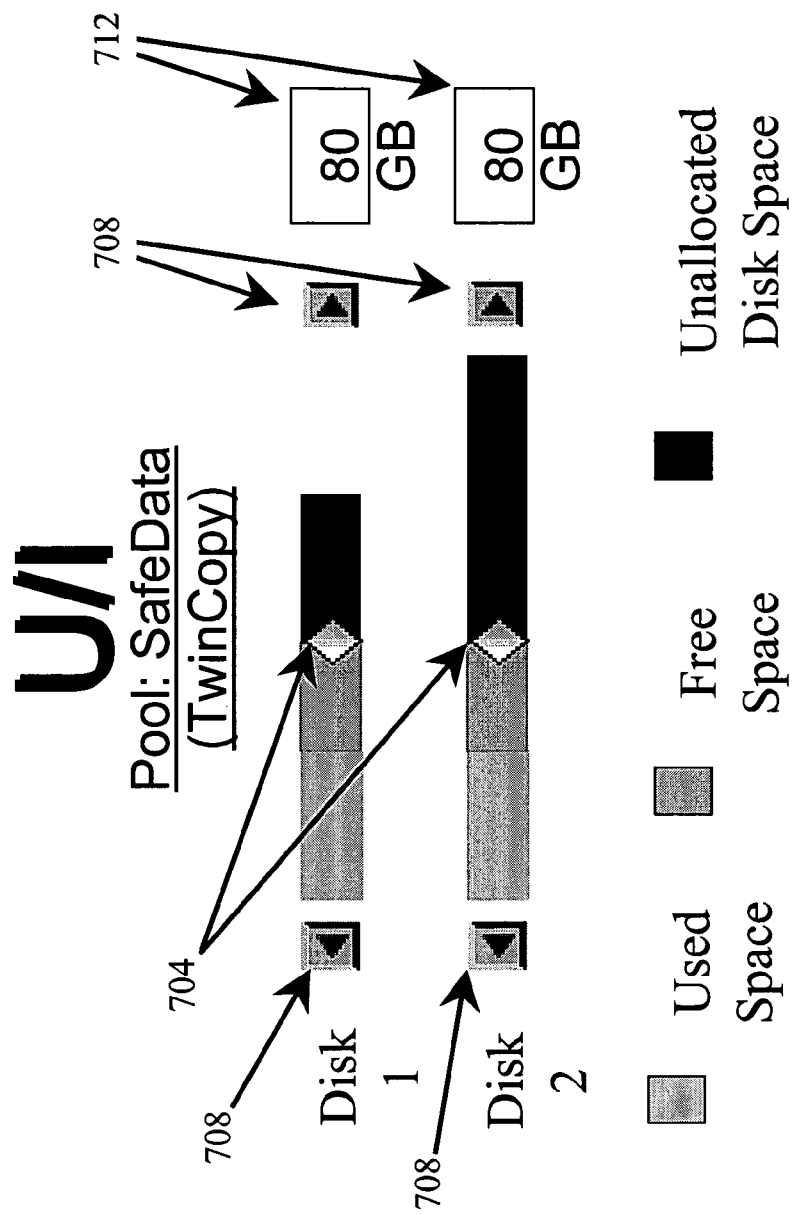
FIG. 7 illustrates a graphical user interface in which a user may re-partition or resize one or more hard disk drives by dragging a selector or adjusting one or more controls within the graphical user interface, in accordance with various aspects of the present invention.

FIG. 7 illustrates a graphical user interface (GUI) in which a user may re-partition or resize one or more hard disk drives by dragging a selector 704 or adjusting one or more controls 708 within the graphical user interface, in accordance with various aspects of the present invention. In this instance, the selector 704 may be positioned using the exemplary mouse. Clicking on the controls 708, with an exemplary mouse, one or more times may move the selector 704 either left or right. Leftward movement decreases while a rightward movement increases the free space, for example. Repetitively clicking on a control may effectuate a rapid movement of the selector 704. As may be visualized, the position of the selector 704 determines the amount of free space available in either disk 1 or disk 2. FIG. 7 illustrates a GUI implementing RAID1. As shown, the used and free space is mirrored and forms the pool named TwinCopy. As a result, the used and free space of Disk 1 is equivalent in size to the used and free space of Disk 2. When the user re-positions the selector 704, the free space on both disks are decreased or increased commensurately. Alternatively, the size of the mirrored disks may be controlled by keyboard input using the size input fields 712. The size input fields 712 may be used when a mouse or other similar device is unavailable to the user. The user simply types the size (e.g., in gigabytes) of the one or more pools into one of the size input fields 712.

The graphical user interfaces illustrated in FIGS. 4-7 may be configured after a user adds one or more hard disk drives into a data storage device such as a NAS. As a result, the user may create, resize, or expand one or more data pools after the storage capacity of the exemplary NAS is increased.

Figure 8:
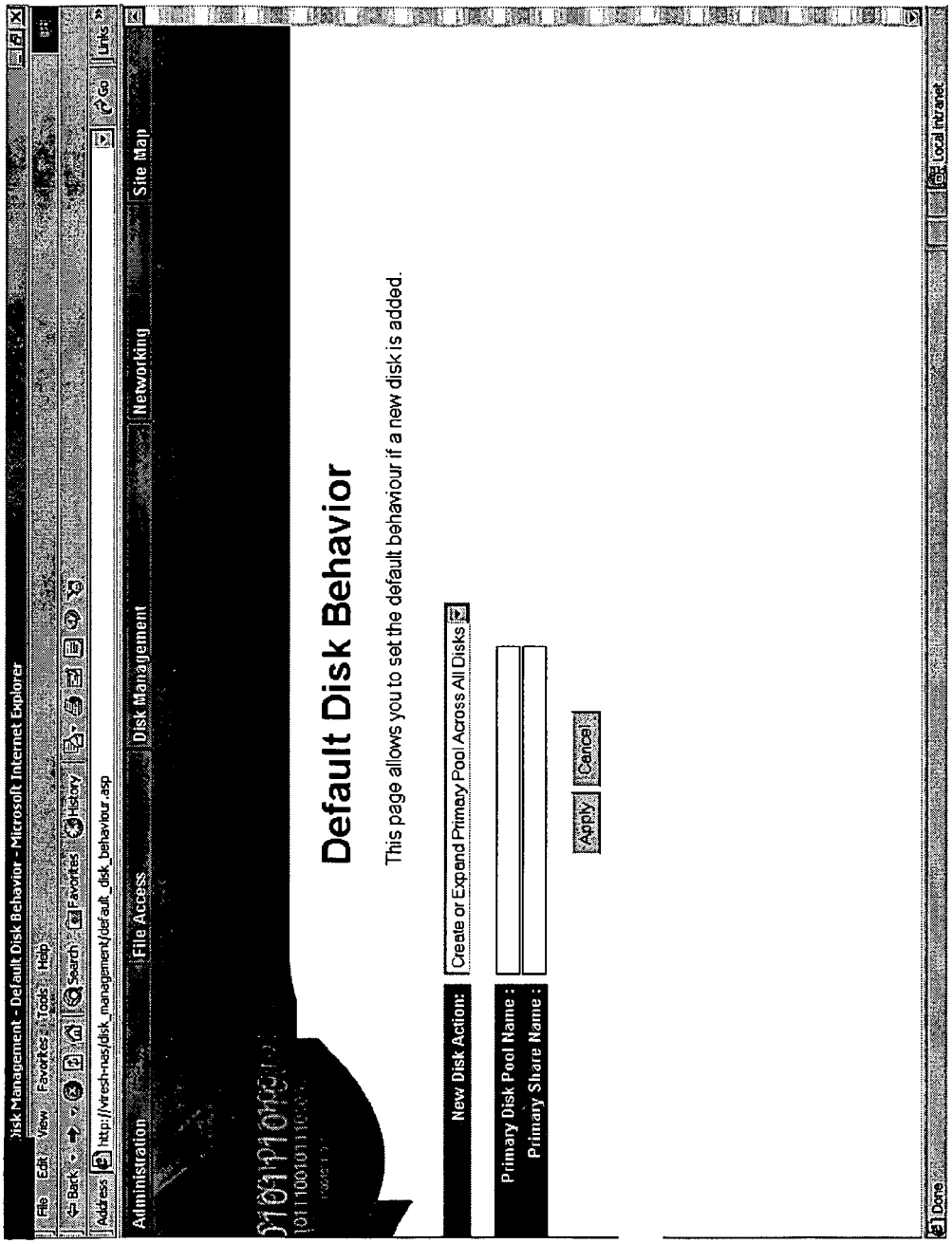
FIG. 8 is a user interface that describes how a data storage device, such as the NAS, facilitates expansion of additional hard disk drives, in accordance with various aspects of the present invention.

FIG. 8 is a user interface that describes how a data storage device, such as the exemplary NAS, facilitates expansion of additional hard disk drives, in accordance with various aspects of the present invention. The user interface allows a user to specify or indicate one or more expansion options when a new disk is added to the NAS. A user, for example, may repetitively add hard disk drives to further expand capacity of the NAS. For example, the user interface may allow the user to select one or more expansion options.

Referring to FIG. 8, one option may be to create one data pool per hard disk drive. When a new disk is added, for example, a new pool and share is created. A pool may comprise disk space that is associated with one or more shares. However, in this representative embodiment, the pool contains one share. A pool may be considered a directory while a share may be considered a subdirectory within the pool. A pool may comprise one or more shares. A share may be accessed by a group of one or more users who have the capability of writing to and reading from a particular pool. If there is more than one share for a pool, the disk space occupied by each share is cumulatively applied against the total space provided by the pool. In a representative embodiment, only one share is created per pool. In accordance with various aspects of the present invention, the names of the pool and share for each disk may be automatically generated by the NAS when the user provides a disk drive name. With respect to various aspects of the invention, the NAS may configure the names of each disk drive by appending a number to the name provided by the user. For example, if the user provides the name MyPool and MyShare as names for the pools and the shares, the NAS uses MyPool1 and MyShare1 for the first hard disk drive, MyPool2 and Myshare2 for the second hard disk drive, etc.

Another option in reference to FIG. 8, allows for the creation and expansion of a pool across all available capacity (capacity that is not allocated by any data pool), in accordance with one or more aspects of the present invention. Various aspects of the present invention allow a user to generate a new primary pool and corresponding share across all hard disk drives, after one or more hard disk drives are added. In this representative embodiment, unallocated disk space over all drives is concatenated and incorporated into the newly created primary pool and its corresponding share.

Again referring to FIG. 8, a third option creates a mirrored primary pool, in accordance with a representative embodiment of the present invention. This option specifies that a primary pool and its mirror (mirror image) may be created after the addition of one or more hard disk drives.

Referring to FIG. 8, a fourth option is such that nothing occurs when a new hard disk drive is added. In representative embodiment, a user manually configures one or more data pools and shares after a disk is added to the NAS, by way of using a user interface.

Figure 9:
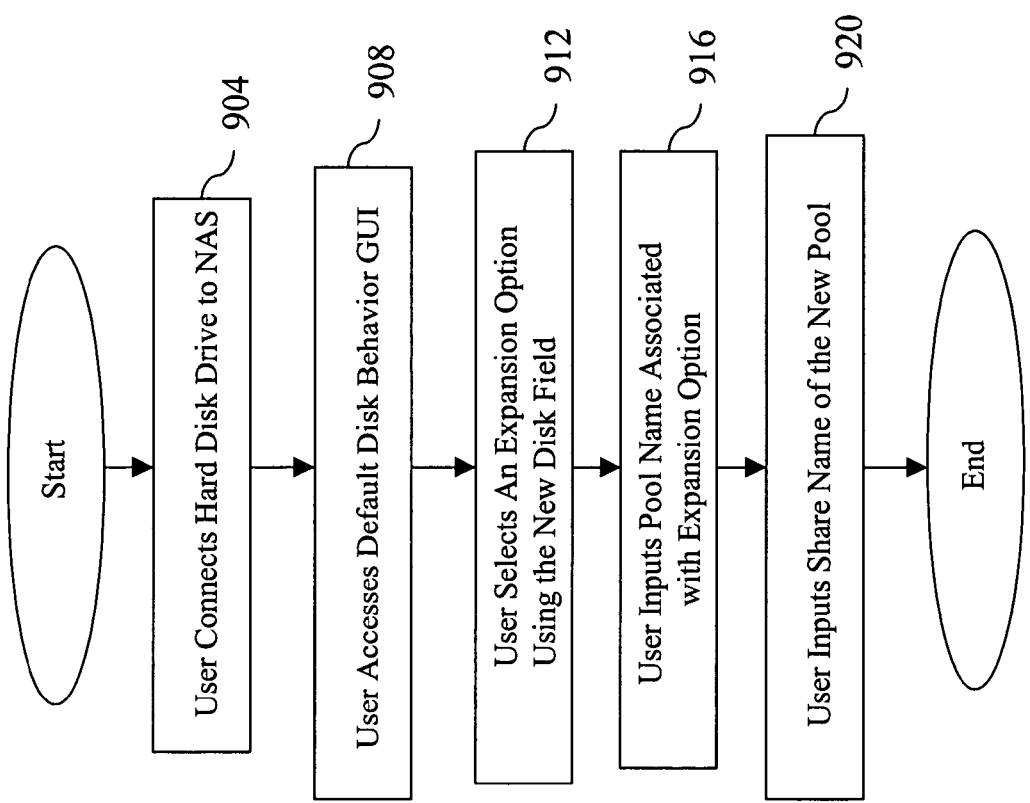
FIG. 9 is an operational block diagram describing the process of adding a hard disk drive to a NAS in accordance with various aspects of the present invention.

FIG. 9 is an operational block diagram describing the process of adding a hard disk drive to a NAS in accordance with various aspects of the present invention. At step 904, a user adds a hard disk drive to the NAS by connecting the hard disk drive to the exemplary "drive sled" previously mentioned. The user may have to connect one or more types of ribbon cables in order to secure the connection between the hard disk drive and the "drive sled". The "drive sled" is then physically connected to the NAS by way of mating connectors. At step 908, the user initiates the display of an appropriate GUI (such as the Default Disk Behavior GUI) so as to configure the hard disk drive. With regard to various aspects of the present invention, the appropriate GUI may be accessed or displayed after the user inputs one or more passwords, for example. In a representative embodiment, the user configures the passwords when the NAS is initialized. Next, at step 912, the user selects one of several expansion options, as described above in relation to FIG. 8, to be performed as a result of adding the new hard disk drive. The expansion option may be selected by way of a "pull-down" field provided by the GUI. At step 916, the user inputs a pool name associated with the expansion option selected. Finally, at step 920, the user inputs a share name associated with the pool name. One or more share names may be created for the pool. In a representative embodiment, if there is more than one share created for a particular pool, the disk space occupied by each share is cumulatively applied against the space provided by the pool.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of automatically expanding storage capacity in a data storage device, said data storage device comprising one or more first hard disk drives, said method comprising:

receiving one or more second hard disk drives by said data storage device;

generating a user interface to a user;

allocating one or more partitions of said one or more first hard disk drives and said one or more second hard disk drives based on an expansion option provided by said user interface; and concatenating said one or more partitions of said one or more first hard disk drives and said one or more second hard disk drives, said concatenating resulting in one or more data pools, said partitions concatenated using one or more data pool information blocks that identify said partitions, each of said one or more data pool information blocks positioned at the beginning of each of said one or more partitions.

2. The method of claim 1 wherein said user interface is generated by said data storage device by way of executing one or more files using an application that identifies and selects said one or more files, said user interface generated at a computing device communicatively coupled to said data storage device, said identifying and said selecting performed by way of a mouse or keyboard.

3. The method of claim 1 wherein each of said one or more data pools comprises one or more shares.

4. The method of claim 1 wherein said expansion option facilitates allocating one data pool to each of said one or more second hard disk drives.

5. The method of claim 1 wherein said expansion option facilitates allocating one data pool over the total capacity provided by said one or more first hard disk drives and said one or more second hard disk drives.

6. The method of claim 1 wherein said expansion option facilitates allocating data from one data pool and its mirror image over the total capacity provided by said one or more first hard disk drives and said one or more second hard disk drives.

7. The method of claim 1 wherein said allocating is performed by inputting one or more parameters into said user interface.

8. The method of claim 7 wherein said one or more parameters comprises hard disk drive capacities or sizes of said one or more first hard disk drives and/or said one or more second hard disk drives.

9. The method of claim 1 wherein said one or more portions comprises free disk space.

10. The method of claim 1 wherein said one or more portions comprises used disk space.

11. The method of claim 1 wherein said one or more portions comprises unallocated disk space.

12. A method of automatically configuring data storage capacity of a data storage device when one or more first hard disk drives are added to said data storage device, said data storage device containing one or more second hard disk drives, said method comprising:
    first generating one or more data pools using said one or more first hard disk drives and said one or more second hard disk drives when a user selects an expansion option; and
    second generating one or more shares using said one or more data pools, said one or more shares providing access to said one or more data pools, wherein authorization to a share of said one or more shares is obtained by way of receiving a password corresponding to said share from said user, said authorization performed at said data storage device, wherein said password is stored in a memory of said data storage device.

13. The method of claim 12 wherein said expansion option specifies allocating one data pool per each of said one or more first hard disk drives.

14. The method of claim 12 wherein said expansion option specifies allocating a single data pool using the maximum capacity provided by said one or more first hard disk drives and said one or more second hard disk drives.

15. The method of claim 14 wherein said single data pool comprises one corresponding share.

16. The method of claim 12 wherein said expansion option specifies allocating data from one data pool and its mirror image using the maximum capacity provided by said one or more first hard disk drives and said one or more second hard disk drives.

17. The method of claim 16 wherein said one data pool comprises one share.

18. The method of claim 12 wherein said one or more data pools comprises unallocated disk space.

19. The method of claim 12 wherein said one or more data pools comprises used disk space.

20. The method of claim 12 wherein said one or more data pools comprises free disk space.

21. A system of automatically expanding storage capacity in a data storage device, said data storage device comprising one or more first hard disk drives, said system comprising:
    a memory;
    a first software resident in said memory, said first software comprising one or more executable files;
    one or more processors used to execute said first software;
    one or more interfaces used to receive one or more second hard disk drives;
    a second software residing in a computing device, said second software used to execute said one or more executable files, said first software capable of automatically reconfiguring data storage capacity of said one or more first and second hard disk drives after said one or more interfaces receives said one or more second hard disk drives, said first software capable of generating one or more data pools, wherein each of said one or more data pools comprises a partition from said one or more first hard disk drives and a partition from said one or more second hard disk drives.

22. The system of claim 21 wherein said first software is used to serve one or more pages from said data storage device using hypertext transfer protocol.

23. The system of claim 21 wherein said reconfiguring comprises repartitioning said one or more first and second hard disk drives.

24. The system of claim 23 wherein said repartitioning comprises adjusting used disk space of said one or more first and said one or more second hard disk drives.

25. The system of claim 23 wherein said repartitioning comprises adjusting free disk space of said one or more first and said one or more second hard disk drives.

26. The system of claim 23 wherein said repartitioning comprises adjusting unallocated disk space of said one or more first and said one or more second hard disk drives.

27. A method of automatically expanding storage capacity in a data storage device, said data storage device comprising one or more first hard disk drives, said method comprising:
    first receiving one or more second hard disk drives by said data storage device;
    generating a user interface to a user when said user executes one or more files;
    second receiving an expansion option from said user by way of said user interface;
    allocating one or more portions of said one or more first hard disk drives and/or said one or more second hard disk drives based on said expansion option; and
    concatenating said one or more portions of said one or more first hard disk drives and said one or more second hard disk drives, said concatenating resulting in one or more data pools, each of said one or more data pools comprising one or more shares, wherein each of said one or more shares is cumulatively applied against the total space provided by each of said one or more data pools.

28. The method of claim 27 wherein said one or more portions comprises free disk space.

29. The method of claim 27 wherein said one or more portions comprises used disk space.

30. The method of claim 27 wherein said one or more portions comprises unallocated disk space.

31. The method of claim 27 wherein said expansion option facilitates allocating one data pool to each of said one or more second hard disk drives.

32. The method of claim 27 wherein said expansion option facilitates allocating one data pool over the total capacity provided by said one or more first hard disk drives and said one or more second hard disk drives.

33. The method of claim 27 wherein said expansion option facilitates allocating data from one data pool and its mirror image over the total capacity provided by said one or more first hard disk drives and said one or more second hard disk drives.

34. The method of claim 27 wherein said allocating is performed by inputting one or more values into said user interface.

35. The method of claim 34 wherein said one or more values comprises hard disk drive capacities or sizes of said one or more first hard disk drives and/or said one or more second hard disk drives.

36. A user interface for automatically configuring data storage capacity of a data storage device when one or more hard disk drives are added to said data storage device comprising:

one or more visual indicators used for selecting an amount of used, unallocated, and free disk space allocated toward a data pool from a plurality of hard disks, said one or more visual indicators repositionable by use of a mouse, said one or more visual indicators used for adjusting storage capacity associated with said used, unallocated, and free disk space, said adjusting performable by way of pointing a cursor generated by said mouse over each of said one of said one or more visual indicators, and positioning said one or more visual indicators to a indicate a desired size representing used, unallocated, and free disk space, said each of said one of said one or more visual indicators associateable with a numerical value, said numerical value displayable on said user interface.

* * * * *